US008298417B2

(12) United States Patent
Lemay et al.

(10) Patent No.: US 8,298,417 B2
(45) Date of Patent: Oct. 30, 2012

(54) INTEGRATED APPARATUS AND SYSTEM FOR THE TREATMENT OF WASTE FLUIDS AND DRAIN NETWORKS

(76) Inventors: Denise Lemay, St-Eustache (CA); André Lafleur, Boucherville (CA); Geoffroi Vallée, Montréal (CA)

(*) Notice: Subject to any disclaimer, the term of this patent is extended or adjusted under 35 U.S.C. 154(b) by 756 days.

(21) Appl. No.: 11/682,556

(22) Filed: Mar. 6, 2007

(65) Prior Publication Data
US 2007/0209988 A1 Sep. 13, 2007

(51) Int. Cl.
*B01D 35/00* (2006.01)
*E03C 1/00* (2006.01)

(52) U.S. Cl. ........ 210/206; 210/262; 210/447; 210/456; 4/629; 4/652

(58) Field of Classification Search .......... 210/150, 210/151, 198.1, 200, 201, 202, 205, 206, 210/262, 601–631, 456, 447, 418; 4/629, 4/652, 288, 289, DIG. 19
See application file for complete search history.

(56) References Cited

U.S. PATENT DOCUMENTS

| 3,655,048 | A | * | 4/1972 | Pergola | 210/608 |
| 3,874,006 | A | * | 4/1975 | Ritter | 4/629 |
| 4,045,351 | A | | 8/1977 | Peterson | |
| 4,320,540 | A | * | 3/1982 | Leavens | 4/287 |
| 4,655,794 | A | * | 4/1987 | Richardson et al. | 210/611 |
| 4,670,149 | A | | 6/1987 | Francis | |
| 4,925,564 | A | * | 5/1990 | Francis | 210/608 |
| 5,030,357 | A | * | 7/1991 | Lowe | 210/669 |
| 5,198,113 | A | * | 3/1993 | Daniels | 210/608 |
| 5,225,083 | A | * | 7/1993 | Pappas et al. | 210/606 |
| 5,227,051 | A | | 7/1993 | Oshima | |
| 5,925,252 | A | * | 7/1999 | Cline | 210/606 |
| 6,019,110 | A | * | 2/2000 | McClure et al. | 210/610 |
| 6,098,813 | A | | 8/2000 | Cini | |
| 6,451,125 | B1 | | 9/2002 | McClure et al. | |
| 6,706,518 | B2 | | 3/2004 | Lorenz et al. | |
| 6,758,965 | B2 | | 7/2004 | Chen | |
| 2002/0023875 | A1 | | 2/2002 | Lorenz et al. | |
| 2006/0076300 | A1 | * | 4/2006 | Mitchell | 210/800 |

FOREIGN PATENT DOCUMENTS

| EP | 0 546 881 | 6/1993 |
| EP | 1 332 113 | 8/2003 |
| JP | 10128386 | 5/1998 |
| WO | 97/46300 | 12/1997 |
| WO | 2006/079141 | 8/2006 |

OTHER PUBLICATIONS

"Renegade Parts Washer FAQ," Service Line, Inc. Dec. 15, 2005 (retrieved from internet archive on Jul. 2009).*
Bio Systems International, "Bio Cube S220 USA",Version No. 3, Jun. 2007, 4 sheets.
Bio Systems International, "Bio Cube S350 USA", Version No. 3, Jun. 2007, 4 sheets.

* cited by examiner

*Primary Examiner* — Lucas Stelling (57) ABSTRACT

An apparatus for treating greasy waste fluids comprises a fluid inlet which receives the waste fluids, and a waste filtering device positioned downstream from the fluid inlet; the waste filtering device is so configured as to retain at least a portion of the particulate matters contained in the waste fluids. The apparatus further comprises a compartment which is so configured as to receive a slow-releasing grease treating formulation. Also, the apparatus comprises a fluid outlet positioned downstream from the compartment. Furthermore, the compartment is so positioned in a flow path defined between the fluid inlet and the fluid outlet as to contact the waste fluids.

45 Claims, 11 Drawing Sheets

INTEGRATED APPARATUS AND SYSTEM FOR THE TREATMENT OF WASTE FLUIDS AND DRAIN NETWORKS

FIELD

The present invention generally relates to apparatuses and systems for the mechanical and biological treatment of wastes. More specifically, the present invention is concerned with an integrated apparatus and a system for the treatment of waste fluids and drain networks.

BACKGROUND

In many food preparation locations, such as restaurants, institutional kitchens, and food transformation plants, large quantities of wastes, mostly from organic sources (animal, vegetal, synthetic) are sent, i.e. flushed, down the drains. This situation often leads to the clogging of the drain network or sewer, even though some kind of removal of solid and particulate matters is often performed prior to sending, i.e. discharging, waste fluids to the drain. This is mainly due to the presence of greasy matters, such as oils and fats, in the waste fluids and sewage, which tend to form a build-up or a coating on the inner walls of the pipes and ducts of the drain and sewer network. The thickness of such build-up or coating gradually increases until problems occur and urgent cleaning by specialized workers becomes necessary. This problem is also amplified by the negligence of many operators who often remove the drain strainer from the reservoirs, such as sinks, tubs, sumps, sunk draining traps, to expedite cleaning jobs, thus allowing more particulate matters to enter the drain pipe.

In an attempt to prevent such drain and sewer clogging and also to help respect governmental directions or regulations about limitations to the types and properties of wastes allowed for discharge to the main sewer, many conventional devices, usually called grease traps, are used to intercept and filter particulate matters. In some cases, biodegradation of the fatty matters from the sewage is provided by such devices, before these fatty matters reach the main sewer.

For example, in U.S. Pat. No. 4,670,149 issued to Francis on Jun. 2, 1987, a bacterial incubator device is provided for installation in a grease trap, together with the addition of culture strains of bacteria to facilitate organic reduction of waste materials. Furthermore, the bacterial incubator comprises high surface area elements, allowing for the multiplication of the solid bacterial growth surface area in the sewage collection system. Although the incubator may improve bio-reduction of wastes in the grease trap and downstream, it is not adapted to provide the treatment of the upstream drain piping and does not assist removal of particulate matters from the waste water at any level.

Although such devices may retain and eliminate some of the unwanted matters in the sewage, besides the bad odors generated in the vicinity of these floor grease traps, three main problems still remain. Firstly, regularly emptying the traps when full is expensive, especially when the work is accomplished by accredited teams and wastes are properly disposed of. Therefore, many non-accredited entrepreneurs offer disposal services at reduced cost but spread the wastes in the nature, causing environmental problems. Furthermore, omitting frequent clean-ups of the traps yields clogging and flooding of the traps, thus leading to the discharge of unwanted matters to the main sewer. Thirdly, such traps are located downstream a more or less elaborate network of drain piping. Therefore, they cannot prevent clogging of the upstream drain pipes.

For all the reasons discussed above, contaminants such as particulate, fatty and oily matters should be intercepted and eliminated as closely as possible to the source reservoir. Sinks are the most common place where wastes are disposed of, reaching the drain pipes and the sewer network or leaching field, in most food preparation locations. Other facilities, such as mechanic shops using sinks or tubs, for hand cleaning or for the cleaning of oily or greasy parts, and using oily sumps or pits, are also concerned with the problem of removing particulate matters and hydrocarbons from the waste fluids, drained from a reservoir.

Some existing devices and apparatuses contemplated this perspective of treating drain wastes and drain piping closer to the source, but only to a limited extent. For example, U.S. Pat. No. 4,045,351 issued to Peterson on Aug. 30, 1977, teaches a sink strainer device, which comprises an elongated cylinder mounted beneath a sink and a mesh strainer mounted into the cylinder and removable through a front opening. The device can intercept a small volume of solid or particulate matters entering the sink drain, but does not provide treatment of the greasy matters contained in the wastes.

In U.S. Pat. No. 6,098,813 granted to Cini on Aug. 8, 2000, a waste water filter system is disclosed. The waste water filter system comprises a disposable stretchable filter positioned in a collector body and removable therefrom through an opening. The filter retains particulate matters and grease without retaining the waste water. Although the system has a fairly large theoretical load capacity, some clogging of the filter mesh rapidly occurs due to the accumulation of greasy matters, thus requiring frequent manipulations (tapping) or changes of the partly filled filter bags. Furthermore, the large system is floor standing and must use an electrical pump to discharge the filtered waste water into the drain, thus requiring an electrical installation, which is not likely to be readily available around the sink.

In U.S. Pat. No. 6,706,518 granted to Lorenz et al. on Mar. 16, 2004, a method and apparatus are disclosed to clear waste water pipes and grease traps clogged with grease, using bacteria and enzymes. However, the apparatus is complex, since it comprises data processing electronics, dosage apparatuses, mixer, temperature control and an activator vessel, in which bacteria from a dry concentrate are grown, for a given time at a predetermined temperature, to produce an aqueous grease solvent to be injected into the drain pipes.

Similarly, Japanese publication No 10-128386 of May 19, 1998, teaches an apparatus for decomposition and deodorization of oil and fat in kitchen waste liquids. The apparatus uses a floor standing bio-reactor to feed micro-organisms, such as bacteria or enzymes, just downstream grease dividing devices, such as filters and air stirring type of devices, mounted beneath the sink tank. Although the apparatus combines mechanical and biological treatments of the waste water near the source, to decompose oil and fat downstream, it fails to provide a convenient integrated apparatus, which does not require preparation and incubation of a bacteria mixture in a separate complex apparatus, for example. The separate complex apparatus generally comprises powered control, conditioning and pumping devices, with a plurality of moving parts and requiring power for operation.

It would therefore be a significant advance in the art of waste treatment apparatuses to provide simple, power-free, i.e. autonomous and un-powered, and low maintenance integrated apparatus and systems, capable of treating, at the source, the waste fluids, discharged in sinks or similar reservoirs, retaining unwanted particulate matters and promoting oil and fat biodegradation. By so doing, prevention of clogging in downstream drain pipes, grease traps and sewer networks or leaching fields is achieved as well as prevention of discharge of problematic and unwanted sewages in the environment.

OBJECTS

An object of the present invention is therefore to provide an apparatus and a system for the treatment of greasy waste fluids, obviating the limitations and drawbacks of the above discussed systems and devices. As examples, features such as near-the-source treatment, autonomous un-powered (power-free) operation and easy maintenance and cleaning are contemplated.

SUMMARY

More specifically, in accordance with the present invention, there is provided an apparatus for treating greasy waste fluids comprising a fluid inlet receiving the waste fluids, a waste filtering device positioned downstream from the fluid inlet, the waste filtering device being so configured as to retain at least a portion of the particulate matters contained in the waste fluids, a compartment so configured as to receive a slow-releasing grease treating formulation and a fluid outlet positioned downstream from the compartment. Furthermore, the compartment is so positioned in a flow path defined between the fluid inlet and the fluid outlet so as to contact the waste fluids.

The present invention also relates to a system for treating greasy waste fluids, comprising: a reservoir having a drain assembly and an apparatus, including a fluid inlet, a waste filtering device positioned downstream the fluid inlet and so configured as to retain particulate matters from the waste fluids, and a compartment so configured as to receive a slow-releasing grease treating formulation. Furthermore, the apparatus is fluidly connected to the drain assembly via the fluid inlet and the fluid outlet is so configured as to be connected to a drain pipe network for fluid evacuation. Also, a portion of the particulate matter present in the waste fluids flowing from the reservoir into the apparatus through the fluid inlet is removed by the waste filtering device and finally the waste fluids collect microscopic live organisms that biodegrade at least a portion of the grease matter contained therein.

The present invention is further concerned with a system for treating greasy waste fluids, comprising: a reservoir having a bottom provided with a fluid outlet and a false-bottom including a drain assembly, a waste filtering device mounted to the drain assembly via a fluid inlet, and a compartment so configured as to receive a slow-releasing grease treating formulation. Furthermore, the fluid outlet is so configured as to be connected to a drain pipe network for fluid evacuation. Also, a portion of particulate matters present in the waste fluids flowing from the reservoir to the drain pipe network is removed by the waste filtering device and finally the compartment is so positioned in a flow path defined between the fluid inlet and the fluid outlet so as to contact the waste fluids.

The foregoing and other objects, advantages and features of the present invention will become more apparent upon reading of the following non-restrictive description of any illustrative embodiments thereof, given by way of example only with reference to the accompanying drawings.

BRIEF DESCRIPTION OF THE DRAWINGS

In the appended drawings:

FIG. 7b is a plan view of the strainer basket of FIG. 7a;

FIG. 8b shows a web mounting ring for installation on the frame of FIG. 8a;

FIG. 10b is a front elevational view of the integrated system of FIG. 10a; and

It is to be noted that identical numerals in the drawings represent similar parts throughout the description.

DETAILED DESCRIPTION

The non-restrictive illustrative embodiments of the present invention will now be described in detail referring to the appended drawings. Although the illustrative embodiments of the present invention will be described by referring to a mounting on a kitchen sink, it shall be deemed applicable and adaptable to other types of fluid reservoirs, such as tubs, sumps, sunk draining traps, pits, etc., provided with a drain and from which waste fluids may be drained.

Figure 1:
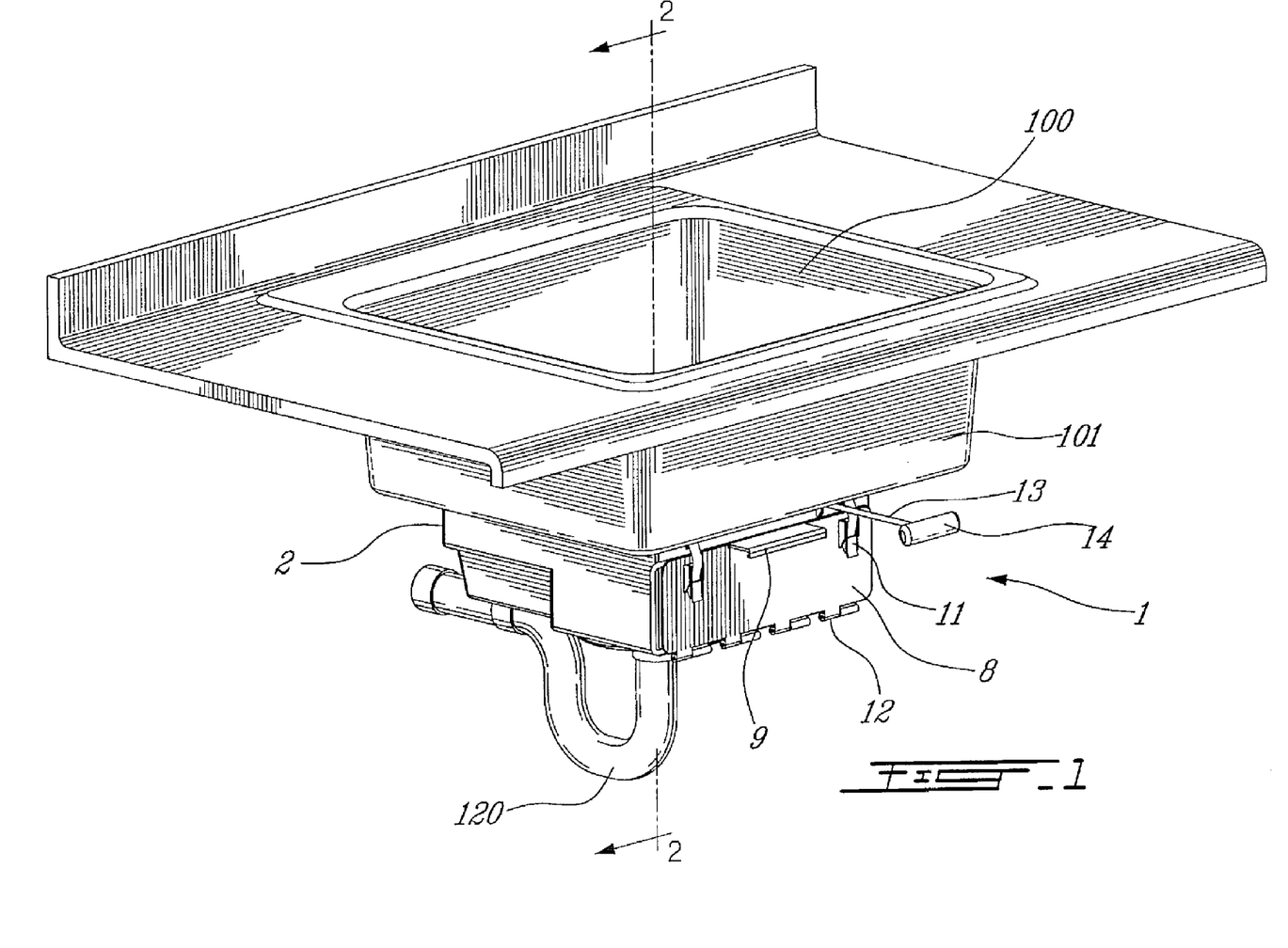
FIG. 1 is an isometric view showing an apparatus for treatment of greasy waste fluids according to a first non-restrictive illustrative embodiment of the present invention; the apparatus is shown mounted underneath the bottom of a sink tank and connected between the sink drain assembly and a drain P-trap.
Figure 3:
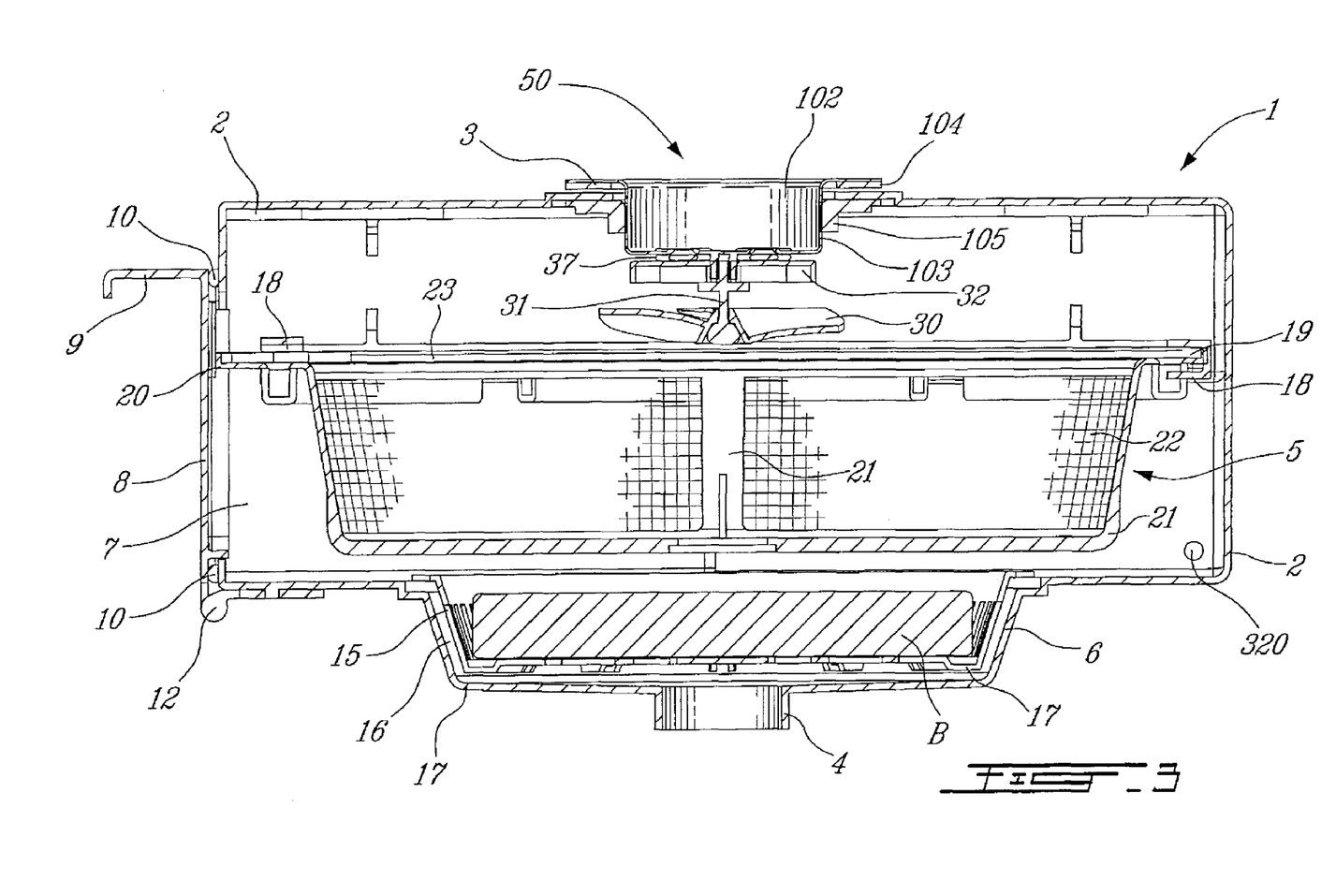
FIG. 3 is an enlarged sectional view of the apparatus of FIG. 1.

Now, an integrated apparatus 1, as shown in FIG. 1, for the treatment of waste fluids will be described. The integrated apparatus 1 is mounted to a sink mounting assembly 50, as illustrated in FIG. 3. The sink mounting assembly 50 comprises a strainer basket 102, a gasket ring 104 and a lock nut 105, as will be described hereinbelow.

More specifically, turning to FIG. 1, the integrated apparatus 1 is mounted between the underside of a tank 101 of a sink 100 and a drain P-trap 120, connected to a drain piping network leading to a main sewer (not shown).

Figure 2:
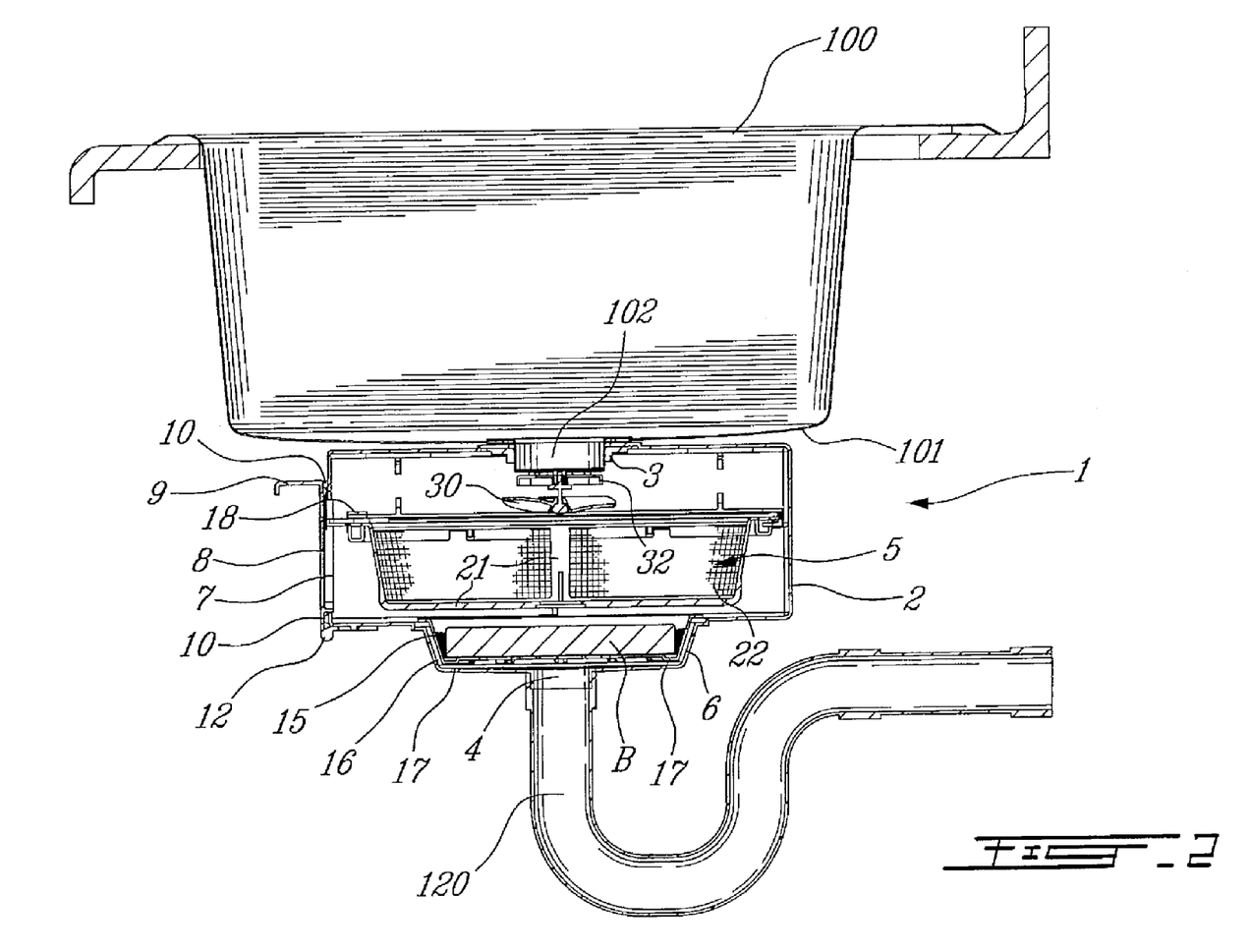
FIG. 2 is a side sectional view of the apparatus of FIG. 1, taken from line 2-2 of FIG. 1.

More specifically, referring to FIGS. 2 and 3, the integrated apparatus 1 comprises a rigid enclosure 2, which can be made of chemical and bacteria resistant material, such as polypropylene, polyethylene or stainless steel. The integrated apparatus 1 is also provided with a fluid inlet 3, which is fluidly connected to a strainer basket 102 of the sink drain assembly, and with a fluid outlet 4, fluidly connected to the P-trap 120. Such an assembly allows the waste fluids, drained from the sink 100, to pass through the apparatus 1 and to be treated before reaching the P-trap 120. Therefore, a flow path is defined between the fluid inlet 3 and the fluid outlet 4, for the waste fluids to flow. Generally stated, the integrated apparatus 1 performs mechanical, chemical and biological treatments of the drained waste fluids as will be described hereinbelow.

It is to be noted that the P-trap 120 is part of the downstream drain piping network and sewer network (not shown), and therefore needs to be cleaned.

The apparatus 1 further comprises a waste filtering basket 5, provided downstream from the sink, for filtering the waste fluids, and a compartment 6 provided downstream from the filtering basket 5 so configured as to receive a solid cake of active, i.e. live, biological organism compound B, through which the waste fluids drained from the sink 100 must circulate before being released through the downstream drain piping network. By so doing, the biological organism compound B releases living micro-organisms into the drain piping network; those living micro-organisms, co-operating with chemical agents also contained in the block B, allow for cleaning the drain piping network from greasy matters. However, it should be noted that the compartment 6 is also so configured as to receive any slow-releasing grease treating formulations, which may be a bio-cake or else.

It should be pointed out that, as shown in FIG. 2, the waste filtering basket 5 and the compartment 6 are housed inside the enclosure 2.

Generally, the apparatus 1 is provided with a low profile design so as to enable retrofit installation thereof, between the sink strainer basket 102 of the sink 100 and the P-trap 120, in typical existing sink installations.

Figure 4:
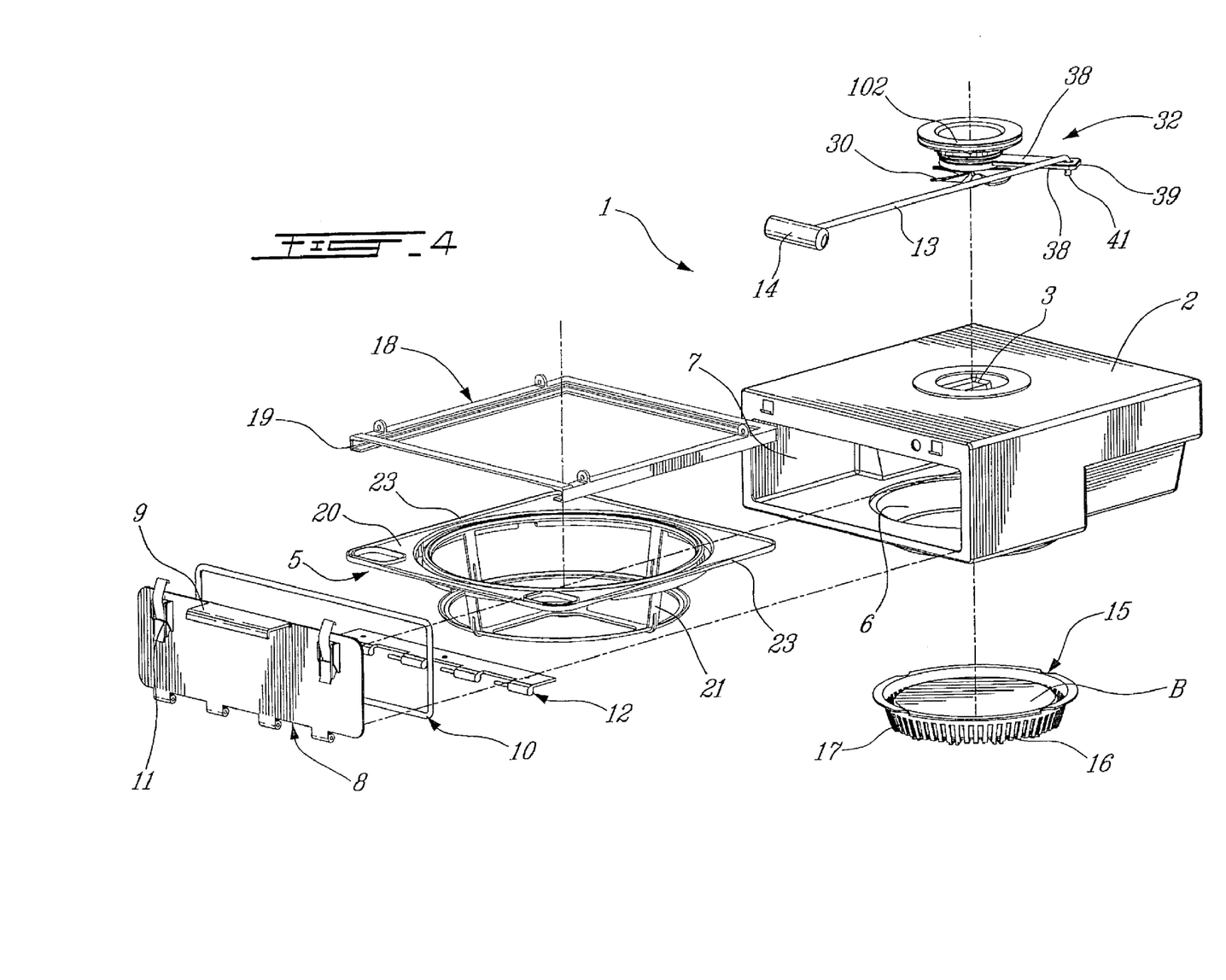
FIG. 4 is a three-dimensional exploded view of the apparatus of FIG. 1.

More specifically, the enclosure 2 of the apparatus 1 is provided with a front opening 7, which extends along most of the width of the apparatus 1, as illustrated in FIGS. 3 and 4. The front opening 7 gives access to the inside of the enclosure 2 through a fluid tight door 8, when opened by using a handle 9. Sealing of the periphery of the door 8 is provided by a peripheral gasket 10 and the door 8 can be locked in the closed position by rotating the locking members 11. More specifically, a bottom hinge 12 enables opening and closing of the door 8.

Returning to FIG. 1, it can also be seen that a rod 13 provided with a handle 14 is further mounted to the apparatus 1, for activating an inflow control valve 32 (better seen in FIG. 3), used to block the inflow of the waste fluids into the enclosure 2 during servicing, as will be described hereinbelow.

The enclosure 2 further includes a supporting frame 18 mounted therein to slidably support the filtering basket 5, suspended above the compartment 6. The frame 18 enables easy and convenient withdrawal of the filtering basket 5 through the access opening 7, for emptying and cleanup. The supporting frame 18 comprises a grooved track 19, adapted to slidably receive the outer edge 23 of the peripheral flange 20 of the filtering basket 5.

The filtering basket 5 comprises a resilient and resonating frame 21, preferably molded from a chemical and bacteria resistant thermoplastic material such as polypropylene, or from stainless steel, and covered by a stretchable filtering web 22. The filtering web 22 can be a nylon mesh screen of mesh size selected according to the type of wastes that need to be retained in the basket 5 and prevented from flowing out of the basket 5 into the compartment 6 and thus into the drain.

It is to be noted that stainless steel mesh filter media (not shown) may also be used depending on the application. These media may be placed into the basket frame 21 which can be also made in stainless steel.

The filtering basket 5 is sized so as to contain a significant volume of solid waste, extracted from the waste fluids coming from the sink 100, before requiring emptying. For example, the basket 5 can hold typically up to 5 liters or about 5 kg of waste.

The geometry and mechanical properties of the basket 5 are properly selected, as known to those of ordinary skills in the art, so as to provide some resilience causing a resonance, i.e. drum skin effect, upon dropping waste thereon. Thereby, such resonance causes stretching of the web 22, at the periphery of the filtering basket 5 and provides a partial auto-cleaning of the web mesh as well as retarding clogging of the filtering basket 5, before the filtering basket 5 is filled to its nominal capacity. Indeed, the stretching of the web 22 increases the mesh size. The capacity of the filtering basket 5 is designed to require, for example, no more than a few clean-up cycles per day. It should be noted that clean-ups are very quick and simple given the easy access to the filtering basket 5 from the opening 7.

Figure 8A:
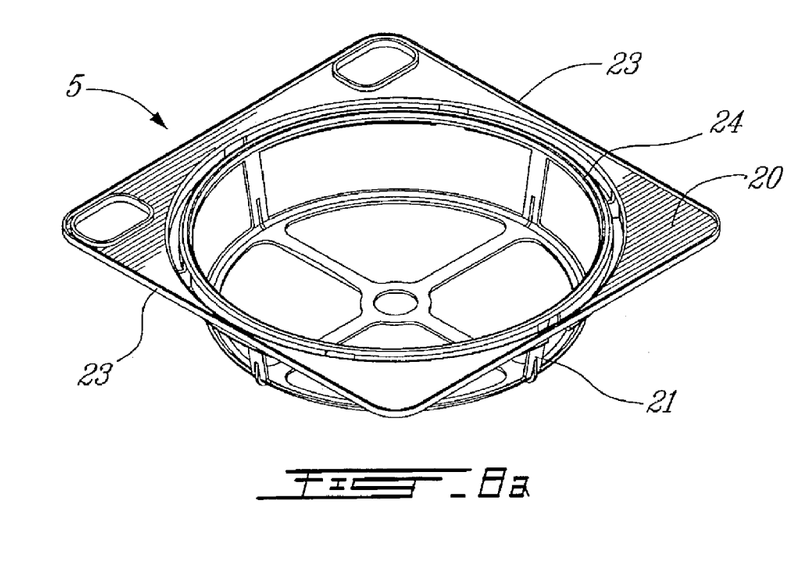
FIG. 8a is an isometric view of a filtering basket frame according to a non-restrictive illustrative embodiment of the present invention.
Figure 8B:
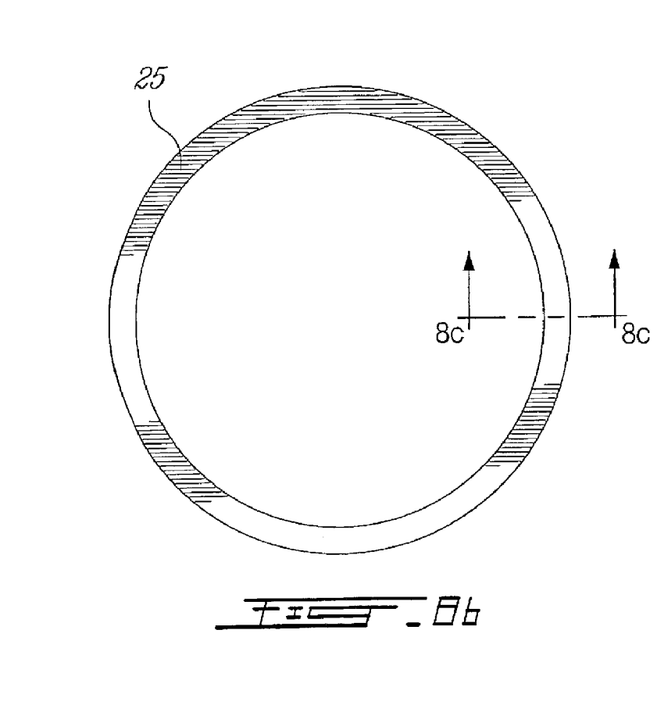
Figure 8C:
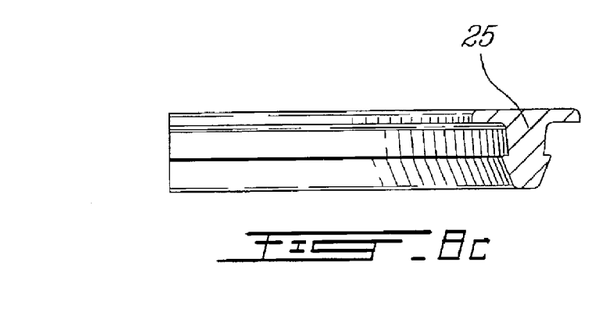
FIG. 8c is a cross-sectional view of the ring of FIG. 8b, as viewed from line 8c-8c.

Furthermore, as illustrated in FIGS. 8a and 8b, a circular groove 24 may be provided in the flange 20 of the filtering basket 5, for receiving a profiled ring 25. The ring 25 is preferably made from a stretchable or elastomer material, such as polypropylene, neoprene, polyurethane or rubber. This structure, comprising the groove 24 and the ring 25, may be used to removably attach the piece of filtering web 22 into the filtering basket frame 21. Thus, a piece of the web 22, cut to the appropriate size, can be positioned in the frame 21 and secured in place by inserting the ring 25 into the groove 24, on top of the screen web. Such a mounting technique enables easy replacement of a damaged web 22 while saving the reusable frame 21. Finally, removal of the ring 25 can be done by pushing on it through openings (not shown) provided at the bottom of the groove 24.

The basket 5, composed of at least the frame 21 and the web 22, forms a waste filtering device positioned downstream from the fluid inlet 3. It is to be noted that while the mesh size of the web 22 has been selected in view of the specific application of the waste filtering device, not all the particulate matters contained in the wastewater are filtered by the waste filtering device, since some of the particulate matters are smaller than the mesh size. One skilled in the art is believed in a position to select an appropriate mesh size for the web 22 according to the desired level of filtration of the resulting filtered waste fluids. For example, a mesh size of 900 μm is considered adequate for most applications. However, the mesh size used can vary and can be smaller, such as 600 μm. Generally stated, a larger mesh size is used so as to avoid an accumulation of particulate matters that would cause rapid clogging. However, when refined filtering is needed, such as in the case of filtering coffee wastes for example, a smaller mesh size could be selected.

Figure 5:
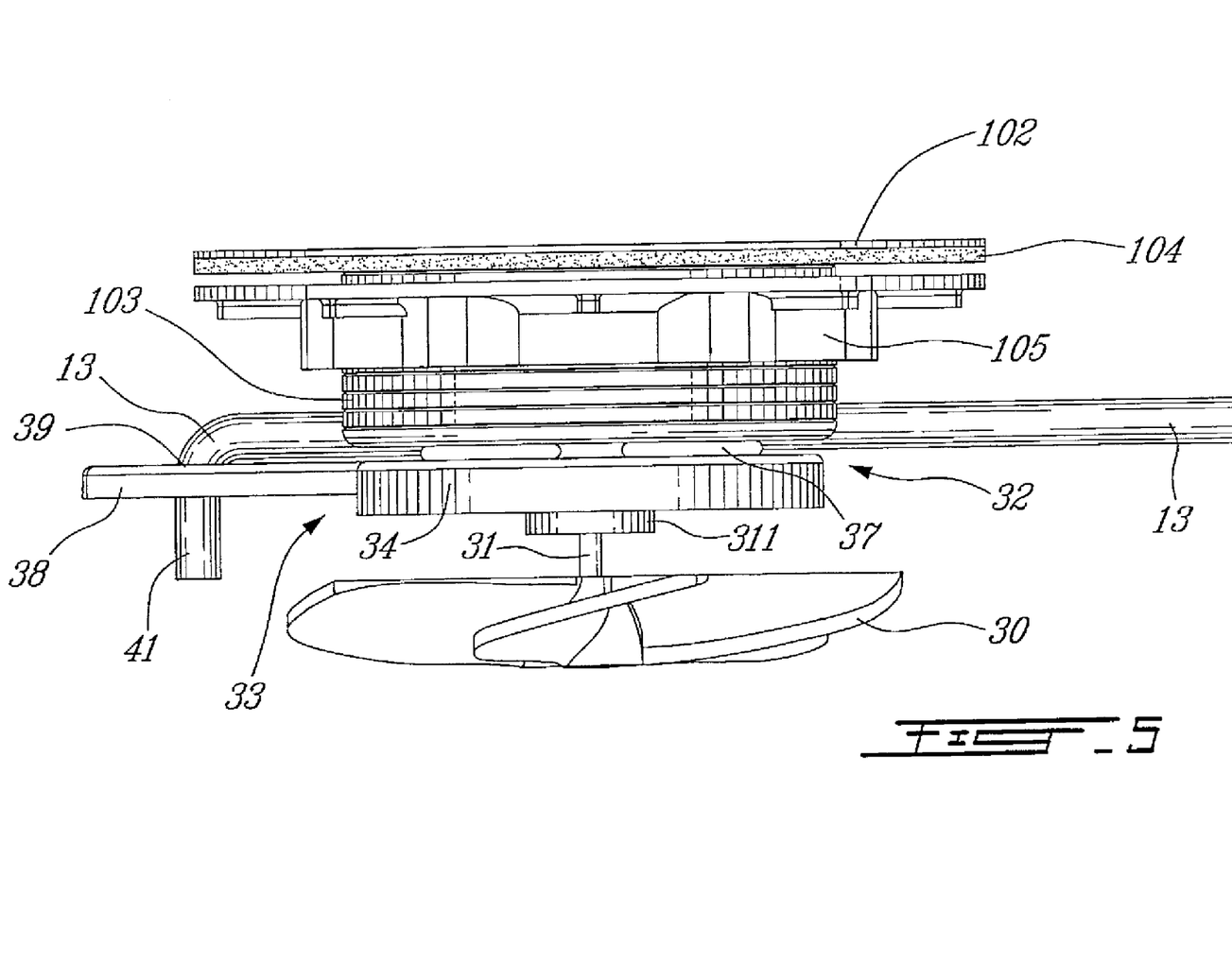
FIG. 5 is a side elevational view of an intake sub-assembly of the apparatus according to a non-restrictive illustrative embodiment of the present invention.
Figure 6:
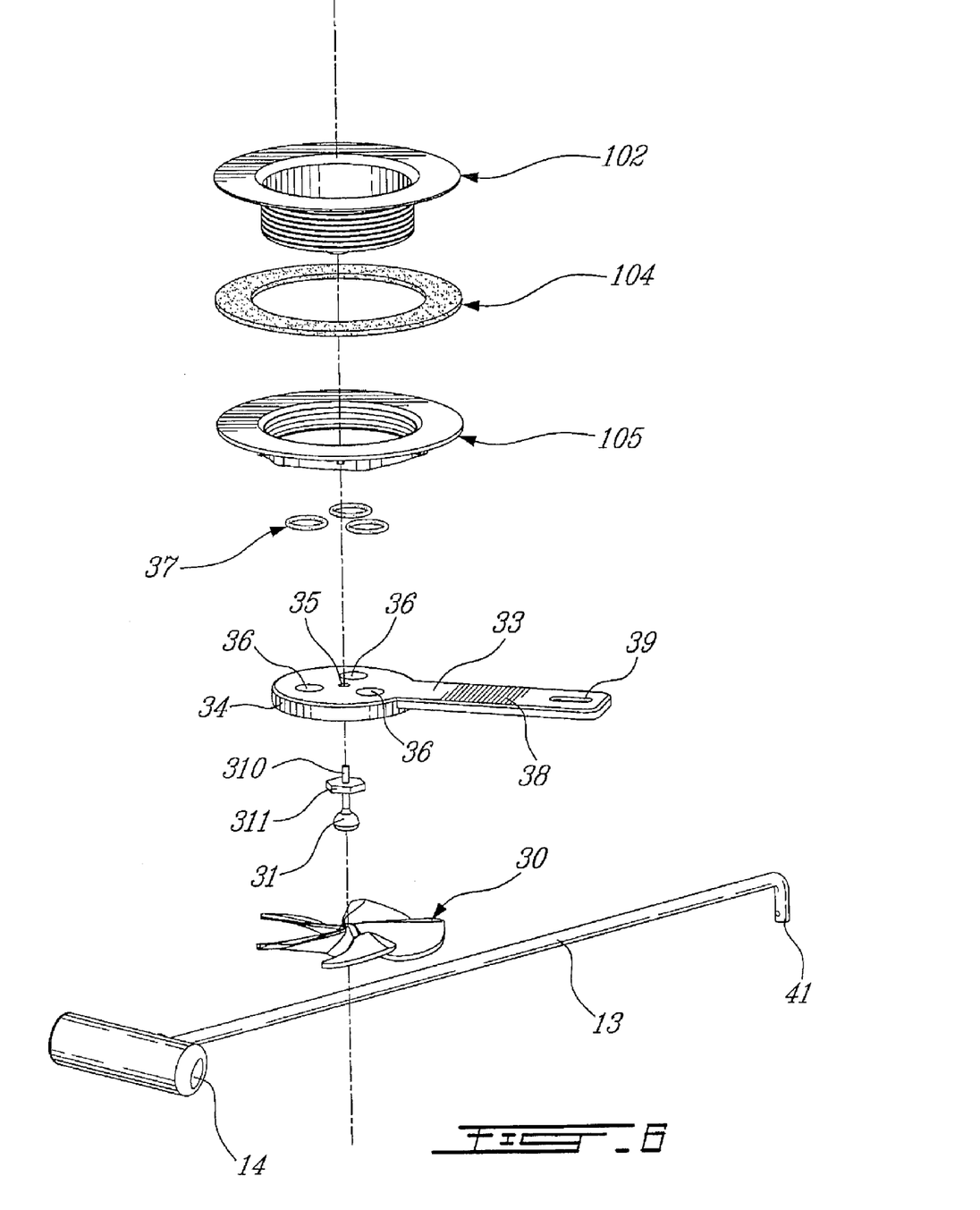
FIG. 6 is a three-dimensional exploded view of the intake sub-assembly of FIG. 5.

Since the waste fluid enters the enclosure 2 by the fluid inlet 3, which is conventionally a relatively standard small centre inlet of typically 1.5 inch diameter, a deflector may be provided downstream from the fluid inlet 3 and upstream from the basket 5, as illustrated in FIGS. 5 and 6. The deflector may take the form of a free-rotating helix 30 that allows for substantially even spreading of the waste fluids over the wide surface of the bottom of the basket 5. The helix 30 is mounted on an axle 31, assembled to the inflow control valve 32 and is so configured as to start rotating when hit by a waste fluid flow from the outlet of the valve 32. When in rotation, the helix 30 diverts the flow away from the centre of the basket 5. Further flow hitting the helix 30 increases the rotating speed thereof, which then projects the fluid still further away from the centre of the filtering basket 5, thus forming rain-like falls rather than a heavy jet of the fluid flow. Therefore, repeated cycles of fluid flow hitting the helix 30 promote a more even distribution of the wastes over the bottom of the filtering basket 5.

The rain-like drops, on the resilient bottom of the filtering basket 5, further cause some hammering at a frequency, which creates some oscillating vertical vibrations of the bottom, which helps the passing of the waste fluids through the elastic mesh of the web 22, covered by accumulated particulate waste matters.

The inflow control valve 32 is used to stop the inflow of the waste fluids in the enclosure 2, from the fluid inlet 3 when the door 8 is open to empty the filtering basket 5, to replace the bio-cake B or for other maintenance operations. In this case, the valve 32 is in a closed position, so as to close the fluid inlet, as will be described hereinbelow.

The assembly of the inflow control valve 32 is better seen in FIGS. 5 and 6. More specifically, the main component of the valve 32 is a pivotable perforated plate 33 provided with an elongated arm portion 38, having an elongated slot 39 at a proximal end thereof, as illustrated in FIG. 6.

The pivotable perforated plate 33 comprises a disk portion 34, having a centre hole 35 and a set of three peripheral holes 36, provided with sealing O-rings 37 thereabout. As can be seen from FIG. 4, the elongated slot 39 is pivotally assembled to a bent distal end 41 of the rod 13, which projects from the front of the enclosure 2, through a fluid tight opening 40. The centre hole 35 of the perforated plate 33 is pivotally assembled to a hub 109, in the bottom of the strainer basket 102 (see FIG. 7c). The strainer basket 102 includes a tapped centre hole 106, in which the threaded portion 310 of the fastener 31 is screwed (see FIG. 6). The fastener 31 also includes a flat portion 311, which prevents axial movement of the plate 33. As will easily be understood by one skilled in the art, the fastener 31 serves as a pivot axis of the perforated plate 33.

Figure 7A:
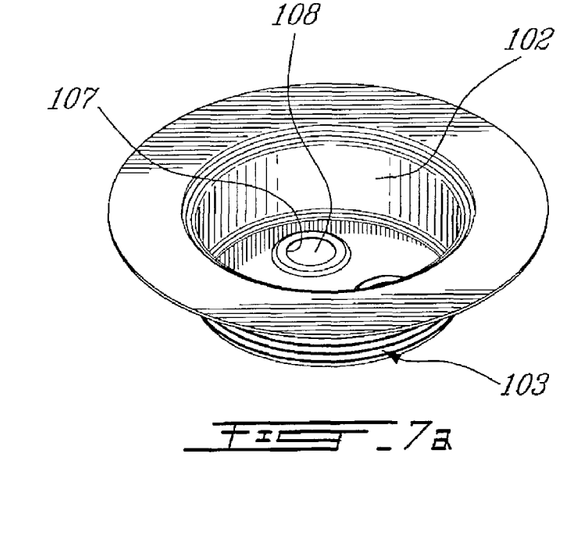
FIG. 7a is an isometric view of a strainer basket of the intake sub-assembly of FIG. 5.
Figure 7B:
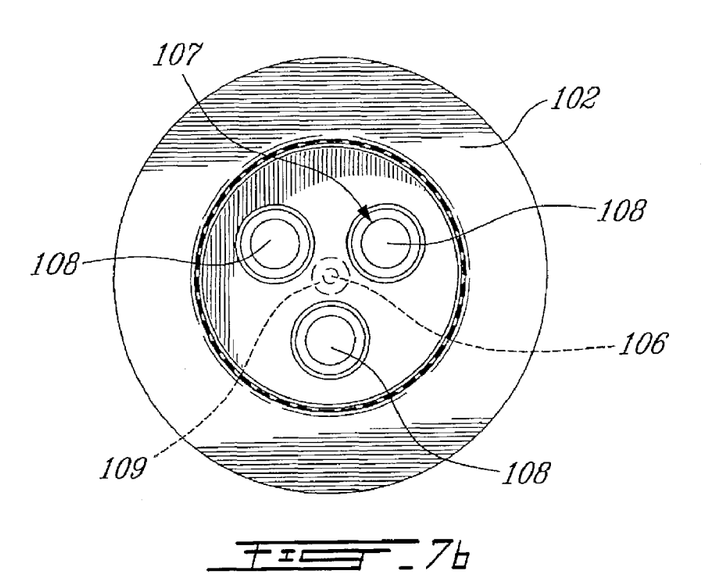
Figure 7C:
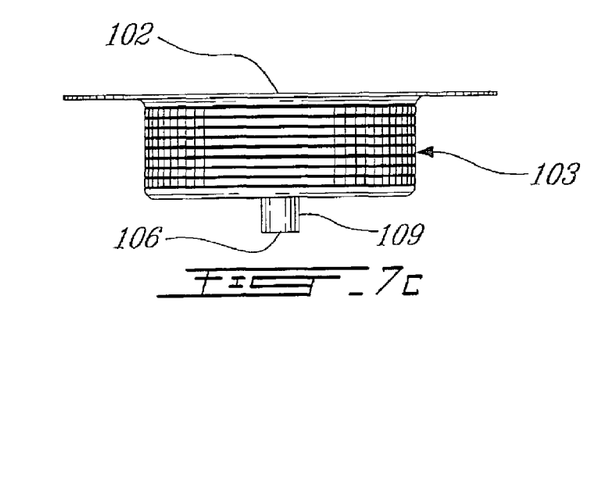
FIG. 7c is an elevational view of the strainer basket of FIGS. 7a and 7b.

The strainer basket 102 further comprises three openings 108, each provided with a peripheral recessed ring 107, as shown in FIG. 7b. The O-rings 37 are pressed against the peripheral recessed rings 107 of the openings 108 on the outer face thereof. An axial movement of the rod 13, through the handle 14, causes a radial displacement of the disk portion 34, between an open position, wherein the holes 36 register with the similar holes 108 at the bottom of the strainer basket 102, and a closed position, wherein the holes 36 are blocked, both positions being spaced apart by an angle of approximately 60 degrees for example.

Returning to FIG. 3, the compartment 6 is located inside the enclosure 2 and contains a removable tray 15 used for receiving a bio-cake B. The compartment 6 is therefore located downstream from the basket 5. As better seen in FIG. 4, the removable tray 15 comprises a plurality of openings 16 and supporting feet 17 for supporting the bio-cake B and enabling the waste fluids coming from the filtering basket 5, to be discharged through the fluid outlet port 4. The waste fluids flow around the bio-cake B and through the tray 15, before being discharged through the plurality of openings 16. The tray 15 can be easily removed through the front opening 7, for cleaning purposes and for replacing the expended bio-cake B with a new one, for example. The tray 15 and the bio-cake B form an active biological device used to biodegrade at least a portion of the greasy matters contained in the filtered waste fluids entering in contact therewith.

It should be noted that, in another non-restrictive illustrative embodiment according to the present invention, the compartment 6 can directly receive and house the bio-cake B. Also, the term "compartment" can include any cavities, which can be located at the bottom of the enclosure 2, or even the bottom of the enclosure 2 itself, so configured so as to receive and house the bio-cake B.

The mounting of the apparatus 1 between the bottom of the sink 100 and the P-trap 120 will now be described with reference to FIG. 3.

First, a gasket ring 104 is placed about the threaded neck 103 of the strainer basket 102, under the lower surface of the sink tank 101 (not shown in FIG. 3). The fluid inlet 3 of the enclosure 2 is then inserted about the threaded neck 103. The mounting of the apparatus 1 is done by screwing a lock nut 105 on the neck 103, from the inside of the enclosure 2. The upper end of the P-trap 120 may then be conventionally connected to the fluid outlet 4. The valve 32 and helix 30 assembly can be then mounted as described hereinabove. The bio-cake B can be placed into the tray 15, then the filtering basket 5 may be installed on the supporting frame 18 so as to form the filtering device. Finally, closing the door 8 sets the apparatus 1 ready for normal operation.

It should be pointed out that no connection to a power source or a pump is required; fluid flows are being naturally established by gravity.

Using the apparatus 1 is therefore very simple and convenient. Indeed, an operator, when discharging waste liquids into the sink drain, merely has to periodically stop the fluid inflow in the apparatus 1. To do so, he/she pulls the handle 14 to close the valve 32 and then opens the door 8 to pull out the filtering basket 5. Once the filtering basket 5 is outside, he/she can then empty it from the accumulated particulate matters, and clean it, for example by rincing it. Finally, after the clean-up, the operator slides the filtering basket 5 back in the grooved track 19 of the supporting frame 18 into the enclosure 2.

It is worth pointing out that the organic particulate matters, so recuperated from the filtering basket 5, may be composted instead of blocking the passage through the drain pipes, developing bad odors and polluting the drain pipes, sewers or filling septic tanks or leaching fields.

If the filtering web 22 is worn out, it can be replaced by a new one. To do so, the operator removes the ring 25, then places a new web 22 and finally replaces the ring 25 into the groove 24.

When the door 8 is closed and the valve 32 is reopened, the apparatus 1 is ready to operate until the next cleaning operation is required, which can be from a few hours to a few days, depending on the use. At regular intervals, for example on a monthly basis, the bio-cake B shall be replaced when a visual inspection during the filtering basket 5 clean-up indicates an almost complete degradation of the bio-cake B in the tray 15.

Even though it happens very rarely, in rare cases, the filtering basket 5 may become blocked, meaning that the filtering web 22 is saturated with particulate matters filtered from the waste fluids. Therefore, as the waste fluids may continue to be flushed down from the sink 100, the filtering basket 5 will fill up and overflow to the enclosure 2. Should the drain outlet 4 become blocked, the waste fluids may fail from being properly drained and accumulate in the enclosure 2. In order to avoid the waste fluids overflowing out of the enclosure 2, when the door 8 is open, a drain plug 320 is provided in a side wall of at the back of the enclosure 2, located at the bottom near the filtering basket 5 as shown in FIG. 3. The drain plug 320 may indeed be removed to allow fluids accumulated inside the enclosure 2 to be drained, i.e. in a vessel, prior to opening the door 8.

As mentioned hereinabove, grease traps located just upstream the main sewer are known to perform some levels of settling and/or filtering and/or biological treatment of the waste fluids from the drain piping network. Therefore, an installation of the apparatus 1 as near as possible to the source of wastes, can advantageously ensure that the waste fluids can be treated before entering the drain piping network. Such treatment prevents accumulation of particulate matters as well as oils and fats in the drain network, thus preventing clogging thereof. Moreover, as described hereinabove, cleaning of the apparatus 1 and seeding of active biological organisms can be easily accomplished by any operator using the sink 100. Therefore, specialized services for emptying and cleaning of the grease trap and drain piping network are only rarely required.

In conventional systems, the micro-organisms are generally seeded in a liquid or powder form, in a culture reactor, which provides a high temperature controlled environment. Furthermore, the micro-organisms are periodically pumped into the pipes after an incubation period. In contrast, according to the non-restrictive illustrative embodiments of the present invention, a slow dissolving solid compound, containing micro-organisms (e.g. bacterial strain) active at normal room ambient temperature, is used.

Therefore, the present invention also relates to a slow-dissolving bio-cake that may comprise an active bacterial strain, a cleaning agent and/or a filling agent. The bio-cake may further comprise a nutrient. The bio-cake of the present invention may be prepared in a solid and/or semi-solid form by processes and methods known to a person skilled in the art. For example, the bio-cake ingredients are mixed, and then extruded from the mixer to a cutting board where the product is cut into various desired shapes such as a block.

As used herein, 'slow dissolving' is meant to describe a bio-cake that may dissolve in greasy waste fluids. Bio-cake dissolution may be dependent on the frequency of use and/or quantity of waste fluids that may come into contact with the bio-cake. Slow-dissolving means that the bio-cake gradually releases an active bacterial strain and/or a cleaning agent upon contact with waste fluids. Slow dissolving bio-cake may dissolve at a rate ranging from about 1 week to 8 weeks such as 1 to 4 weeks and/or 4 to 8 weeks.

By 'active' bacterial strain it is meant a live bacterial strain that may biodegrade greasy waste fluids. Such bacterial strain may grow following dissolution of and/or release from the bio-cake in waste fluids. In an exemplary embodiment of the present invention, the bacterial strain may be active at room temperature. It is to be understood herein that the bacterial strain of the present invention may be those showing better (increased, superior, higher) resistance to the surfactant concentration used in the bio-cake. Advantageously, the bio-cake comprises high surfactant concentration allowing for improved waste fluids treatment and providing bacterial strains which are active at such concentration.

More particularly, in accordance with an embodiment of the invention, bacterial strains may comprise strains of the *Bacillus* genus. In an additional embodiment, bacterial strains of the present invention may comprise strains of the *Pseudomonas* genus. In a further embodiment, bacterial strains of the present invention may comprise strains of the *Paenibacillus* genus. In an exemplary embodiment of the present invention, the bacterial strains may be for example *Bacillus lichenformis, Bacillus megaterium, Bacillus subtilis, Bacillus circulans* and/or mixtures thereof. In another exemplary embodiment of the present invention, the bacterial strains may be for examples *Pseudomonas putida, Pseudomonas fluorescens* and/or mixtures thereof. In yet another exemplary embodiment of the present invention, the bacterial strain may be *Paenibacillus polymyxa*.

For purposes of the present invention, a cleaning agent may comprise a surfactant. 'Surfactant' refers to a surface active agent that displays wetting and/or detergent and/or foaming and/or emulsifying properties. The concentration of surfactant of the present invention may be substantially high. For example, the concentration of the surfactant may range from about 10-50% inclusively. It is to be understood herein, that a 'range' of concentration relates to and explicitly incorporates herein each and every specific member and combination of sub-ranges therein whatsoever. Thus, any specified range is to be understood as a shorthand way of referring to each and every member of a range individually as well as each and every possible sub-ranges encompassed therein. With respect to a surfactant concentration of about 10-50%, this is to be understood as specifically incorporating herein each and every individual concentration, as well as sub-range, between 10% and 50% inclusively, such as, for example, about 10% to 15%, about 15% to 20%, about 20% to 25%, about 25% to 30%, about 30% to 35%, about 35% to 40%, about 40% to 45% or about 45% to 50%. In an exemplary embodiment of the present invention, the surfactant may be, without limitation, Cocamide MEA and/or Calsoft F-90.

In accordance with the present invention, 'filling agents' may be, without limitation, a preservation agent and/or a solubilisation agent and/or a thickening agent and/or an absorbent and/or an odorant and/or a colorant and/or mixtures thereof. Exemplary embodiments of filling agents may include, without limitation, magnesium stearate and/or sodium sulphate and/or Calsoft F-90 and/or paraffin wax and/or nonylphenol polyethylene glycol ether and/or corn bran and/or wheat bran and/or citrus perfume blend, etc.

As used in the present invention, 'nutrient' is meant to be a substance and/or a mix of substances that may allow the growth and/or maintenance and/or survival and/or reproduction of a bacterial strain. Such substances may include, but are not limited to, amino acids and/or salts and/or metals and/or sugars and/or lipids and/or nucleic acids and/or hormones and/or vitamins and/or fatty acids, etc. A nutrient of the present invention may be a corn syrup mixture.

An exemplary bio-cake composition of the present invention may comprise Cocamide MEA (about 15%), perfume blend (odorant; about 1%), magnesium stearate (about 1%), viable bacterial strains (about 1%), sodium sulfate (about 53%) and/or Calsoft F-90 (about 29%). Another exemplary bio-cake composition of the present invention may comprise active bacterial strains, paraffin wax, disodium phosphate, nonylphenol polyethylene glycol ether, corn syrup mixture, corn bran, wheat bran, odorant and/or preservative.

In a further aspect, the present invention relates to the use of a slow-dissolving bio-cake for biodegrading greasy waste material.

Accordingly, to provide biological degreasing of the waste fluids in the drains, a user merely has to place a bio-cake B in the compartment 6 of the apparatus 1. When in contact with the waste fluids, partial dissolution of the bio-cake B occurs, thus releasing a quantity of active micro-organisms into the drain network. Thereby, the released living micro-organisms adhere and develop (grow) on the inner walls of the drain piping network, as well as in the grease trap. The micro-organisms allow for biodegrading oil and fat matters, for preventing clogging and ensuring that the properties of the sewage reaching the main sewer are environmentally acceptable and comply with the regulations. Therefore, the drain network is cleaned through the action of the micro-organisms.

A bio-cake B has been developed to enable gradual release of active micro-organisms from the apparatus 1. It may further include ingredients that promote chemical cleaning of the drain pipes. Such a product is being produced exclusively for the applicant under the trade name Chrystal 1 by Bio-Systems International of the USA.

Culture strains of grease biodegrading micro-organisms, which are active at room temperature, such as bacillus bacteria and/or enzymes (typically *Bacillus Lichenformis, Bacillus Megaterium, Bascillus Subtilis, Bacillus Circulans*, etc.), are combined in a matrix of inert and/or chemically active and/or filling and/or nutrient material such as wax, paraffin, coconut fatty acid (surfactant), sodium linear alkalybenzene sulfonate (foaming agent), filler and moisture absorbing powder, such as sodium sulfate, honey, cereals, perfume blends or the like, to form a compounded cake that can be stored in a wide range of temperature conditions (from 0 degrees Celcius to 40 degrees Celcius).

The bio-cake B may be later subjected to a gradual erosion/dissolution through fluid contacts in the apparatus 1, so as to release active micro-organisms capable of growing and converting greasy matters at room temperature, without special preparation and conditioning equipment. If desired, the bio-cake B may include chemical cleaning agents, such as surfactant and foaming agents, whose characteristics and nature are well known to those of ordinary skill in the art. Those chemical cleaning agents are simultaneously released to improve pipe cleaning performance, while the micro-organisms biodegrade greasy matters in the pipes and in the grease trap, thus allowing a treatment of the draining network.

It should be noted that different culture strains, better adapted to degradation of hydrocarbon based greases and oils, may be used for applications, such as machine shops and mechanical facilities, where hand and part cleaning, for example, is carried out in drained reservoirs, such as sinks or tubs. The facilities are usually provided with grease traps and are facing problems similar to those of the food processing industry. Again, the combination of mechanical filtering, bio-treatment and chemical cleaning agents, using only a bio-cake as the active ingredient, in an integrated apparatus, mounted next to the source of the waste fluid, appears as the an effective and convenient solution.

It is to be noted that the developed bio-cake B may be molded in a variety of sizes and shapes, with selected variable micro-organism releasing rates, so that a given bio-cake B may be provided according to the needs of a specific site installation and the fluid flow characteristics in that installation. Adequate micro-organism release can thus be enabled for every application, while a selectable bio-cake replacement frequency, in the order of once or twice per month, can be achieved. As mentioned hereinabove, replacing the bio-cake B in the apparatus 1 is very simple and quick and can be done by any operator using the sink 100.

Although the present invention has been described hereinabove by reference to a mounting of an integrated apparatus beneath a sink, it should be considered that a further alternate embodiment could also contemplate a mounting downstream other types of fluid reservoirs, such as tubs, steam pots, sumps, sunk draining traps, pits, and connected to a drain or sewer network, or to a leaching field. Also, components, such as the filtering basket 5, the bio-cake compartment 6 and the tray 15 in the enclosure 2 may be shaped or located differently.

Figure 9:
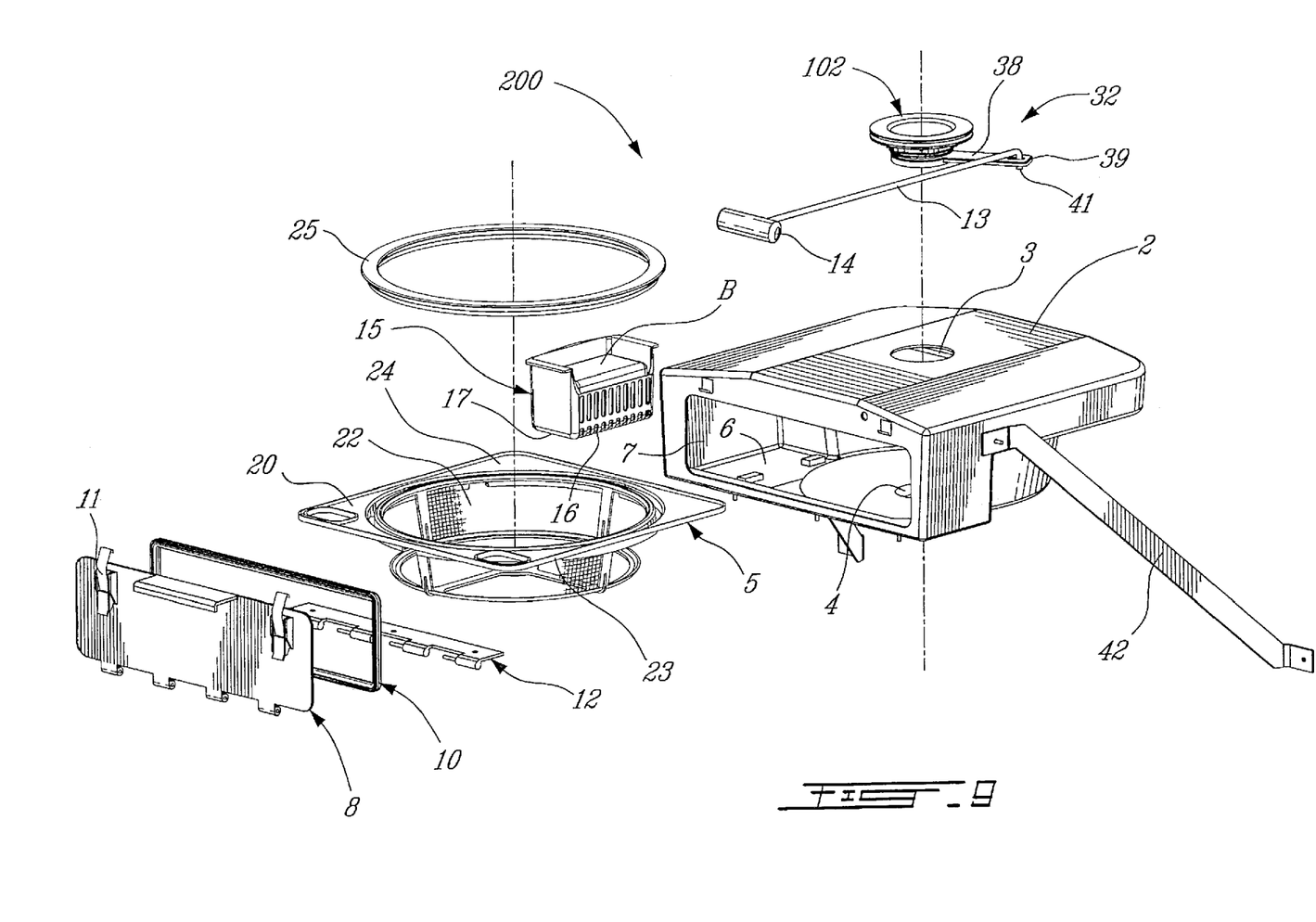
FIG. 9 is a three-dimensional exploded view of an apparatus for the treatment of greasy waste fluids according to a second non-restrictive illustrative embodiment of the present invention, wherein an alternate component layout has been implemented, and mounting brackets have been added.

FIG. 9 provides an example of such a redesigned apparatus 200 according to a second illustrative embodiment of the present invention. The apparatus 200 has generally equivalent performance. Supporting brackets 42 have been added to mount a heavier apparatus, such as 200, to the reservoir or peripheral counters (not shown). It should be noted that in this alternative embodiment of the present invention, although the bio-cake compartment 6 is shaped to receive a thick bio-block B and is not positioned directly beneath the filtering basket 5, it is nevertheless being washed up by a controlled flow of waste fluids that exit the basket 5. Indeed, the bottom of the enclosure 2, beneath the filtering basket 5, is designed with inclined surfaces (slopes) to direct a portion of the percolating fluids toward the compartment 6, where a sloping channel enables the fluids to then reach a lower portion of the bottom connecting to the fluid outlet 4. The compartment 6 may thus be considered downstream from the basket 5. The other elements are similar to those described in the apparatus 1, therefore, they have the same numerals and will not be further described herein, for concision purposes.

As can be seen in FIG. 9, the compartment 6 does not have to be located downstream from the filtering basket 5. Indeed, the compartment 6 can also be located upstream from the filtering basket 5. In that case, to mount the apparatus 200, first the bio-cake B is placed in the compartment 6, then the filtering basket 5 is put in the enclosure 2 and finally, the door 8 is closed so as to set the apparatus 200 ready for operation.

Figure 10A:
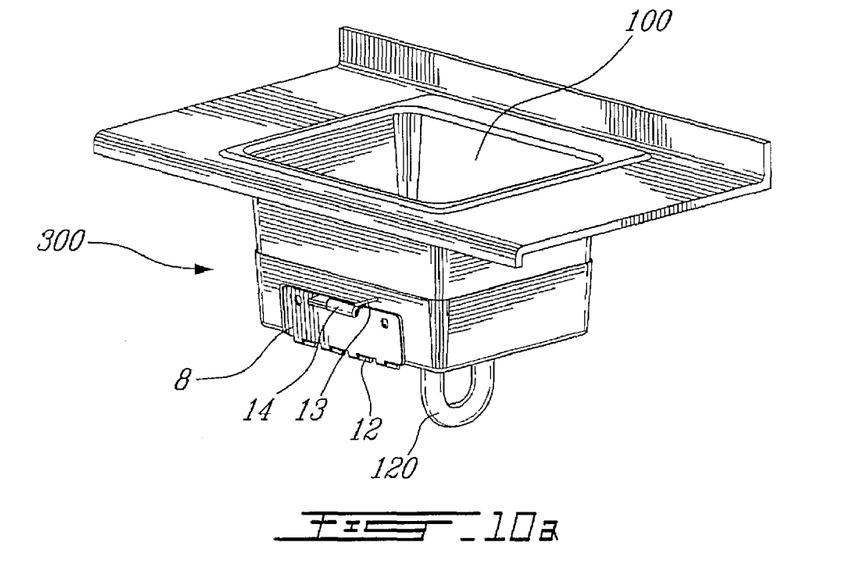
FIG. 10a is an isometric view of an integrated system according to a third non-restrictive illustrative embodiment of the present invention, in which waste treating elements are incorporated between a false-bottom and a bottom of a reservoir.
Figure 10B:
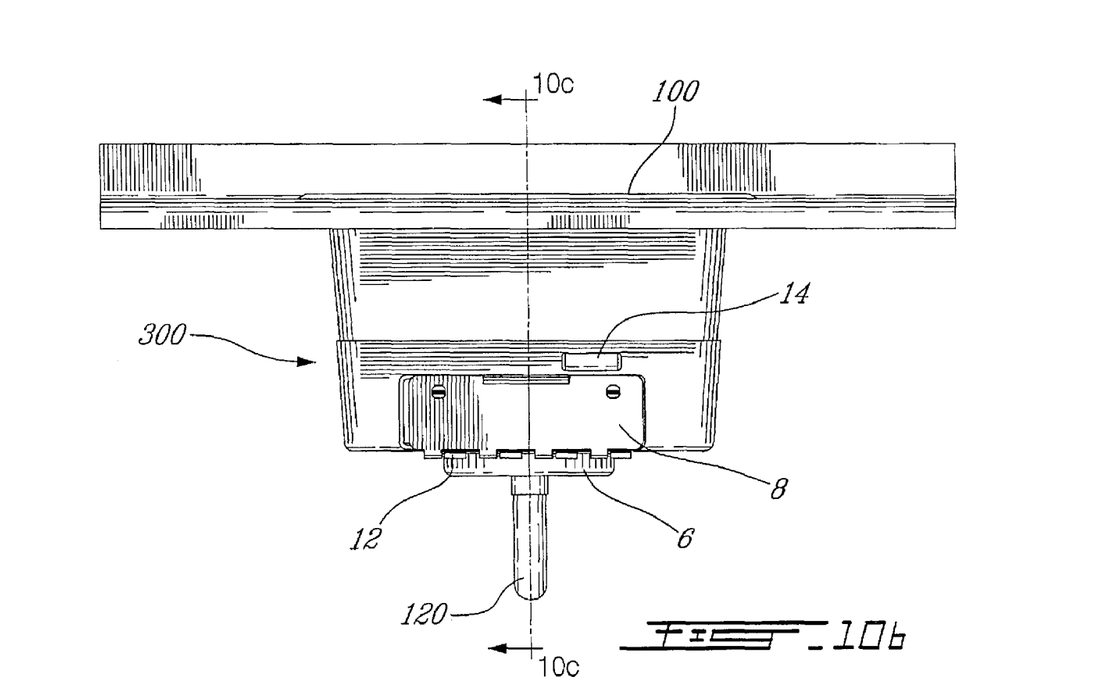
Figure 10C:
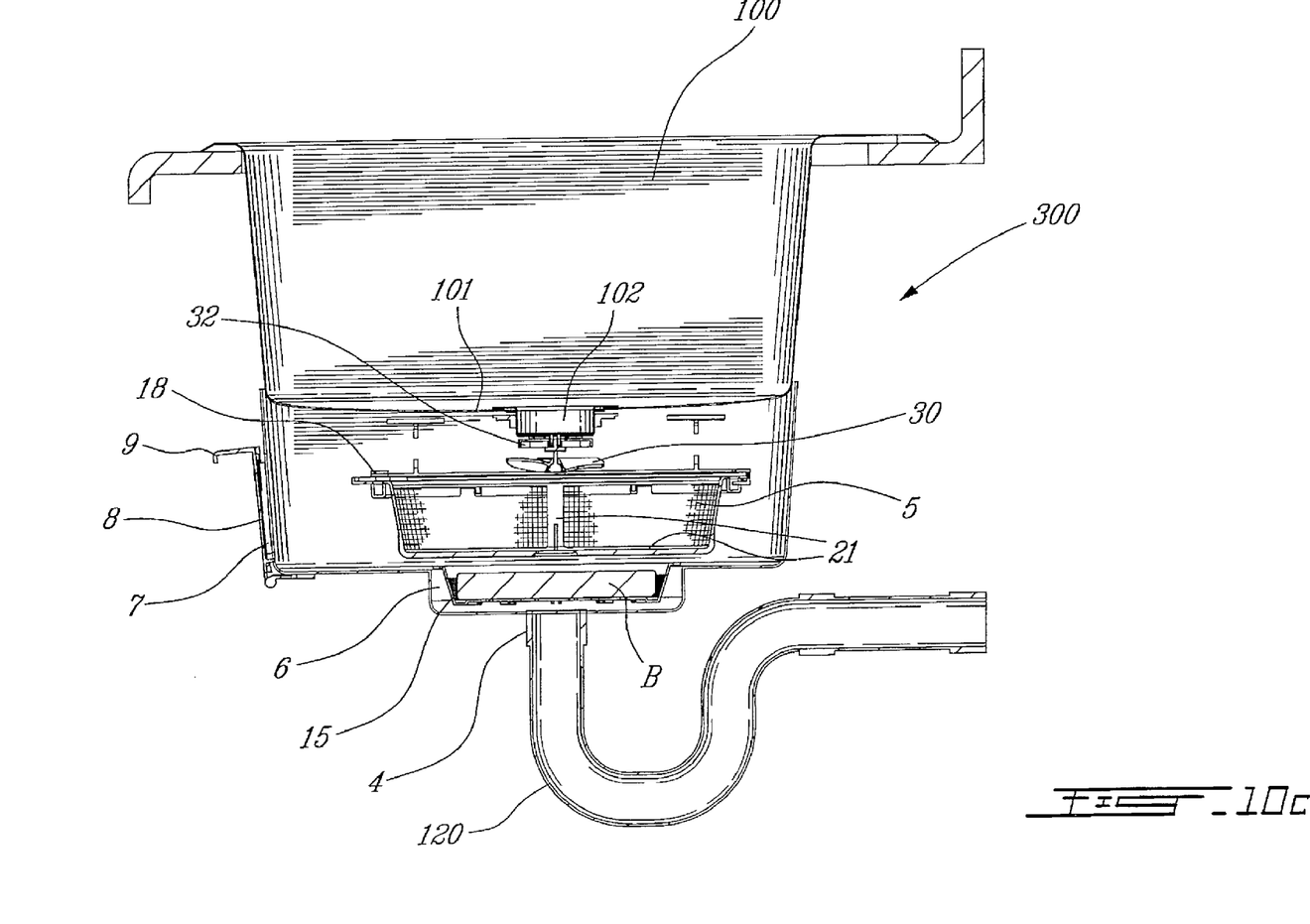
FIG. 10c is a cross-sectional view of the integrated system of FIG. 10b, as viewed from line 10c-10c.

Furthermore, as shown in FIGS. 10*a* to 10*c*, a system 300 for the treatment of greasy waste fluids according to a third illustrative embodiment of the present invention may also be a built-in integrated reservoir or sink unit. The system 300 comprises a reservoir or sink 100, having a false-bottom 101 on which a drain assembly 102 is mounted.

The system 300 further comprises a reservoir bottom defining a recessed compartment 6 for nesting a bio-cake B and comprising a fluid outlet 4 for fluid tight connection to the drain piping 120. Furthermore, a waste filtering basket 5 is mounted on a supporting frame 18 downstream from the drain assembly 102 and upstream from the compartment 6 and the fluid outlet 4. Waste fluids flowing from the reservoir through the drain assembly 102 are freed from most of their particulate matter content by flowing through the filtering basket 5. When the water fluids flow through the compartment 6, they enter in contact with the bio-cake B and dissolve some of the biological compound of the bio-cake B. By dissolving, the bio-cake B releases some microscopic live organisms, which are then collected by the waste fluids flowing through the compartment 6. The microscopic live organisms contained in the waste fluids allow for colonizing the inner walls of the drain pipe network 120 with growing live biological organisms, when the waste fluids reach the drain pipe network 120. Finally, an opening 7, which can be closed by a fluid-tight door 8 is provided on the front wall of the reservoir or sink 100 of the system 300 for servicing.

Again, although the waste fluid treating system 300 is represented as a stand-alone sink unit, the unit may be implemented into other types of fluid collecting reservoirs, such as floor draining sumps, traps and pits. However in such cases, since the front and side walls of the reservoir are not likely to be user accessible, the access opening, such as 7, and the door 8 may be omitted and the false-bottom 101 may be made removable for servicing the components located beneath. In these cases, the flow control valve 32 becomes useless and may therefore be also omitted. Nevertheless, a bypass tubing (not shown) may be provided between the drain assembly 102 and the fluid outlet 4 to prevent flooding, should the filtering basket 5 or the bio-cake strainer tray 15, acting as a second level filter, become clogged before planned servicing is carried out. Such a bypass tubing may be implemented in the other embodiments of the present invention as well, such as in the apparatus 1.

One can thus easily appreciate that the above described illustrative embodiments of the integrated apparatus for the treatment of greasy waste fluids obviate the limitations and drawbacks of the conventional devices and systems. Namely, the illustrative embodiments of the present invention provide the possibility of combining mechanical separation, biological treatment and chemical treatment of wastes fluids near the source with a simple, reliable and cost effective apparatus requiring no electrical supply, light maintenance and available as a stand-alone unit or an enclosure adapted to be readily retrofit on most sink, tub or other existing reservoir installations. Depending on the composition of the bio-cake B, and the mesh size of the filter web 22, different types of applications may be contemplated, such as sinks in food processing facilities or washing tubs in mechanical facilities dealing with hydrocarbon based products and small metallic particles for example.

Although the present invention has been described hereinabove by way of preferred embodiments thereof, it can be modified without departing from the spirit and nature of the subject invention as defined in the appended claims.

What is claimed is:

1. An apparatus for treating greasy waste fluids and drain pipe networks comprising:
   a fluid inlet for receiving the waste fluids;
   a waste filtering device comprising a filtering basket covered with a filtering medium, the filtering basket comprising a resilient resonating frame configured for receiving the filtering medium in a stretched manner, the waste filtering device being for positioning downstream from the fluid inlet and being configured for retaining at least a portion of particulate matters contained in the waste fluids;
   a compartment;
   a solid or semi-solid slow-dissolving bio-cake in the compartment, the bio-cake comprising a slow-releasing grease treating formulation; and
   a fluid outlet positioned downstream from the compartment and connected to a drain pipe network;
   wherein the compartment is positioned in a flow path defined between the fluid inlet and the fluid outlet for contacting the waste fluids with the bio-cake resulting in the gradual release of the grease treating formulation for treating the drain pipe network from greasy matters.

2. An apparatus as defined in claim 1, further comprising an enclosure for housing the waste filtering device and the compartment.

3. An apparatus as defined in claim 2, wherein the enclosure is made of chemical and bacteria resistant material.

4. An apparatus as defined in claim 3, wherein the chemical and bacteria resistant material includes at least one element selected from the group consisting of polypropylene, polyethylene and stainless steel.

5. An apparatus as defined in claim 2, further comprising a reservoir so configured as to mount the enclosure thereto; the reservoir being so connected to the fluid inlet as to supply waste fluids thereto.

6. An apparatus as defined in claim 5, wherein the reservoir is fluidly connected to the fluid inlet through a reservoir drain outlet.

7. An apparatus as defined in claim 6, wherein the reservoir includes a sink mounting assembly interconnecting the reservoir drain outlet and the fluid inlet.

8. An apparatus as defined in claim 2, wherein the enclosure further includes an access door mounted on a side of the enclosure, the access door being for removal and for insertion of the waste filtering device.

9. An apparatus as defined in claim 1, further comprising a support frame so configured as to support the waste filtering device.

10. An apparatus as defined in claim 1, wherein the filtering medium is stretchable.

11. An apparatus as defined in claim 1, wherein the filtering medium is removable.

12. An apparatus as defined in claim 1, wherein the filtering medium includes a web.

13. An apparatus as defined in claim 1, wherein the filtering basket is so sized as to hold about 5 kg of particulate matters.

14. An apparatus as defined in claim 1, wherein the compartment includes a removable tray.

15. An apparatus as defined in claim 14, wherein the removable tray includes a plurality of openings.

16. An apparatus as defined in claim 1, wherein the compartment is located downstream from the filtering device.

17. An apparatus as defined in claim 1, wherein the slow-dissolving bio-cake comprises:
   a) an active bacterial strain;
   b) a cleaning agent; and
   c) a filling agent.

18. An apparatus as defined in claim 17, wherein the bio-cake further comprises a nutrient.

19. An apparatus as defined in claim 17, wherein the cleaning agent comprises a surfactant.

20. An apparatus as defined in claim 17, wherein the bacterial strain is active at room temperature.

21. An apparatus as defined in claim 17, wherein the bacterial strain biodegrades greasy waste fluids.

22. An apparatus as defined in claim 21, wherein the bacterial strain is of the *Bacillus* genus.

23. An apparatus as defined in claim 22, wherein the bacterial strain is selected from the group consisting of *Bacillus lichenformis, Bacillus megaterium, Bacillus subtilis, Bacillus circulans*, and mixtures thereof.

24. An apparatus as defined in claim 17, wherein the filling agent is selected from the group consisting of a preservation agent, a solubilisation agent, a thickening agent, an absorbent and mixtures thereof.

25. An apparatus as defined in claim 2, further comprising an inflow valve located downstream from the fluid inlet and upstream from the waste filtering device; the inflow valve being so configured as to selectively close the fluid inlet.

26. An apparatus as defined in claim 25, wherein the inflow valve includes a pivotable perforated plate assembly.

27. An apparatus as defined in claim 26, wherein the pivotable perforated plate assembly is connected to a valve actuating member accessible from outside of the enclosure.

28. An apparatus as defined in claim 25, comprising a handle connected to a rod for actuating the inflow valve.

29. An apparatus as defined in claim 1, wherein the solid or semi-solid slow-dissolving bio-cake is under the form of a thick block having a given shape.

30. An apparatus as defined in claim 1, wherein the resonating frame is for resonating under a flow path, thereby causing stretching of the filtering medium and providing at least a partial auto-cleaning of the filtering medium.

31. An apparatus as defined in claim 1, wherein the resonating frame comprises a bottom formed of a plurality of resilient members, a plurality of hollowed-out portions being formed being the plurality of resilient members.

32. An apparatus as defined in claim 1, wherein the waste filtering device is removable from the apparatus and insertable into the apparatus.

33. An apparatus as defined in claim 32, wherein removal of the waste filtering device is for cleaning and emptying of the waste filtering device.

34. An apparatus as defined in claim 32, wherein removal of the waste filtering device is for replacing the filtering medium.

35. An apparatus as defined in claim 1, wherein the waste filtering device is placed above the bio-cake.

36. An apparatus as defined in claim 1, wherein the fluid outlet is positioned at the bottom of the apparatus.

37. An apparatus as defined in claim 36, wherein the fluid outlet is for continuously draining the apparatus.

38. A system for treating greasy waste fluids and drain pipe networks, comprising:
- a reservoir having a drain assembly; and
- an apparatus as defined in claim 1, fluidly connected to the drain assembly via the fluid inlet;
- wherein a portion of the particulate matters present in the waste fluids flowing from the reservoir into the apparatus through the fluid inlet is removed by the waste filtering device.

39. An apparatus for treating greasy waste fluids comprising:
- a fluid inlet for receiving the waste fluids;
- a waste filtering device comprising a filtering basket covered with a filtering medium, the filtering basket comprising a resilient resonating frame configured for receiving the filtering medium in a stretched manner, the waste filtering device being for positioning downstream from the fluid inlet and being configured for retaining at least a portion of particulate matters contained in the waste fluids;
- a compartment so configured as to receive slow-releasing grease treating formulation;
- a fluid outlet positioned downstream from the compartment;
- an inflow valve located downstream from the fluid inlet and upstream from the waste filtering device; the inflow valve being so configured as to selectively close the fluid inlet; and
- a fluid deflector located downstream from the inflow valve and upstream from the waste filtering device;
- wherein the compartment is positioned in a flow path defined between the fluid inlet and the fluid outlet for contacting the waste fluids.

40. An apparatus as defined in claim 39, wherein the fluid deflector includes a helix.

41. An apparatus as defined in claim 40, wherein the fluid deflecting helix is mounted to an axle, assembled to the inflow valve, and so configured as to rotate when hit by the waste fluid flow coming from the inflow valve.

42. An apparatus as defined in claim 40, wherein the waste filtering device includes a filtering basket covered with a filtering medium and wherein deflection of the waste fluids on the helix causes vibrations on the filtering basket.

43. A system for treating greasy waste fluids and drain pipe networks, comprising:
- a reservoir having a bottom provided with a fluid outlet connected to a drain pipe network and a false-bottom including a drain assembly;
- a waste filtering device comprising a filtering basket covered with a filtering medium, the filtering basket comprising a resilient resonating frame configured for receiving the filtering medium in a stretched manner, the waste filtering device being for positioning downstream of the drain assembly;
- a compartment; and
- a solid or semi-solid slow-dissolving bio-cake in the compartment, the bio-cake comprising a slow-releasing grease treating formulation;
- wherein a) the waste filtering device is for removing a portion of particulate matters present in the waste fluids flowing from the reservoir to the drain pipe network and b) the compartment is so positioned in a flow path defined between the drain assembly and the fluid outlet for contacting the waste fluids with the bio-cake resulting in the gradual release of the grease treating formulation for treating the drain pipe network from greasy matters.

44. An apparatus for treating greasy waste fluids and drain pipe networks comprising:
- a fluid inlet for receiving the waste fluids;
- a waste filtering device comprising a filtering basket covered with a filtering medium, the filtering basket comprising a resilient resonating frame configured for receiving the filtering medium in a stretched manner, the waste filtering device being for positioning downstream from the fluid inlet and being configured for retaining at least a portion of particulate matters contained in the waste fluids;
- a compartment;
- a solid or semi-solid slow-dissolving bio-cake in the compartment, the bio-cake comprising a slow-releasing grease treating formulation comprising at least one active bacterial strain; and
- a fluid outlet positioned downstream from the compartment and connected to a drain pipe network;
- wherein the compartment is positioned in a flow path defined between the fluid inlet and the fluid outlet for contacting the waste fluids with the bio-cake resulting in the gradual release of the at least one active bacterial strain for colonizing the drain pipe network and biodegrading greasy waste fluids.

45. An apparatus for treating greasy waste fluids and drain pipe networks comprising:
- a fluid inlet for receiving the waste fluids;
- a waste filtering device comprising a filtering basket covered with a filtering medium, the filtering basket comprising a resilient resonating frame configured for receiving the filtering medium in a stretched manner, the waste filtering device being for positioning downstream from the fluid inlet and being configured for retaining at least a portion of particulate matters contained in the waste fluids;
- a compartment;
- a solid or semi-solid slow-dissolving bio-cake in the compartment, the bio-cake comprising a slow-releasing grease treating formulation comprising at least one active bacterial strain; and
- a fluid outlet positioned downstream from the compartment and connected to a drain pipe network;
- wherein the compartment is positioned in a flow path defined between the fluid inlet and the fluid outlet for contacting the waste fluids with the bio-cake resulting in the gradual release of the at least one active bacterial strain for colonizing the drain pipe network and biodegrading greasy waste fluids at room temperature.

* * * * *